United States Patent [19]
McGehee

[11] Patent Number: 4,784,751
[45] Date of Patent: Nov. 15, 1988

[54] METHOD AND APPARATUS FOR RECLAIMING CONTAMINATED OIL

[75] Inventor: Ronald R. McGehee, Tucker, Ga.

[73] Assignee: Keller Machine Works, Atlanta, Ga.

[21] Appl. No.: 911,159

[22] Filed: Sep. 24, 1986

[51] Int. Cl.$^4$ .................................................. C10M 175/00
[52] U.S. Cl. ..................................... 208/181; 208/179; 208/182; 208/184; 208/186; 208/187; 585/1
[58] Field of Search ............... 208/179, 181, 187, 186; 585/1

[56] References Cited

U.S. PATENT DOCUMENTS

| | | | |
|---|---|---|---|
| 1,717,096 | 6/1929 | Czarny et al. | 208/179 |
| 1,866,970 | 7/1932 | Garland et al. | 208/179 |
| 3,249,438 | 5/1966 | Topol | 208/187 |
| 3,332,856 | 7/1967 | Hart | 585/1 |
| 3,341,449 | 9/1967 | Howard | 208/179 |
| 3,990,963 | 11/1976 | Audibert et al. | 208/179 |
| 4,006,084 | 2/1977 | Priest | 208/179 |
| 4,179,019 | 12/1979 | Danziger | 208/179 |
| 4,189,351 | 2/1980 | Engel | 208/179 |
| 4,213,845 | 7/1980 | Masuda | 208/18 |
| 4,227,969 | 10/1980 | Engel | 208/179 |
| 4,269,695 | 5/1981 | Silk et al. | 208/264 |
| 4,289,578 | 9/1981 | Greenfield et al. | 208/187 |
| 4,289,583 | 9/1981 | Engel | 208/179 |
| 4,411,774 | 10/1983 | Johnson | 208/179 |

*Primary Examiner*—H. M. S. Sneed
*Assistant Examiner*—Helane Myers
*Attorney, Agent, or Firm*—Patrick F. Henry, Sr.

[57] ABSTRACT

Contaminated oil is reclaimed for fuel use by pumping same through an oil filter into one side of a divided tank then through a heater to burn off water and antifreeze and then into the other side of the divided tank where the oil is blended with other clean oil, such as diesel fuel, which is then pumped through a water separator and another oil filter into a fuel supply tank from which it is pumped and used for blending. The divided tank is mounted on wheels and carries the various components such as pumps, heater, valves, piping, filter and so forth.

10 Claims, 2 Drawing Sheets

METHOD AND APPARATUS FOR RECLAIMING CONTAMINATED OIL

The apparatus unit of the present invention comprises a divided tank, that may be moved from one place to another, and which supports the different components, such as pumps and filters, so that the unit may be used in almost any garage, plant or service station to produce usable oil, sometimes called diesel. The method comprises pumping the contaminated oil through a basic oil filter which removes impurities down to 5 microns and then into a divided tank from which it is heated to remove impurities such as antifreeze and water and then returned to the divided tank for blending with clean fuel, such as diesel that has been recovered, and thence through a water separator and oil filter.

It is known to recover contaminated oil such as used crank case oil by a chemical process similar to cracking basic oil from the oil well or through filtering and chemical procedures involving such things as clay and soil filtration and the burning off of impurities. This is a very effective procedure for large quantities of oil and it requires the construction and operation of an oil recovery plant which produces noxious odors and fumes and must qualify according to local ordinances and regulations as well as any applicable EPA standards. Such procedures are certainly not acceptable for use on a small scale in a repair facility for diesel trucks, service stations or other similar locations. The present apparatus may be constructed from various components arranged about and supported on a basic double divided tank which can be approximately 4 ft. high by 4 ft. wide by 3 ft. deep. This makes it possible for use in truck service facilities and other places where there are large numbers of diesel engines so that the fuel can be removed from the tanks, as well as from storage tanks, and recycled through the present method and apparatus to clean the fuel, including removal of water and antifreeze, as well as solid contaminants so that the fuel is usable in diesel engines. Furthermore, dirty crank case oil and other contaminated, heavy oil can be blended in the present procedure to produce a diesel fuel supply.

An object of the present invention is to provide a simple and expedient method and apparatus for removing contaminants from oil in a procedure which does not require the use of chemical processes and on a smaller scale than normally found in oil reclaiming procedures.

Still another object and advantage of the present invention resides in the compact nature of the apparatus which is basically a divided tank on which are mounted the various components.

Another advantage of the present invention is found in the pumping and circulation of the contaminated fuel supply so as to blend same with reclaimed or other uncontaminated fuel supply in a continuous process which produces a quantity of uncontaminated fuel in a tank or other container which is used to recirculate some of the uncontaminated fuel back into the blending process.

Other and further objects and advantages of my invention will become apparent upon reading the following description of a preferred method and embodiment taken in conjunction with the accompanying drawings, in which.

DESCRIPTION OF A PREFERRED METHOD AND EMBODIMENT

Figure 1:
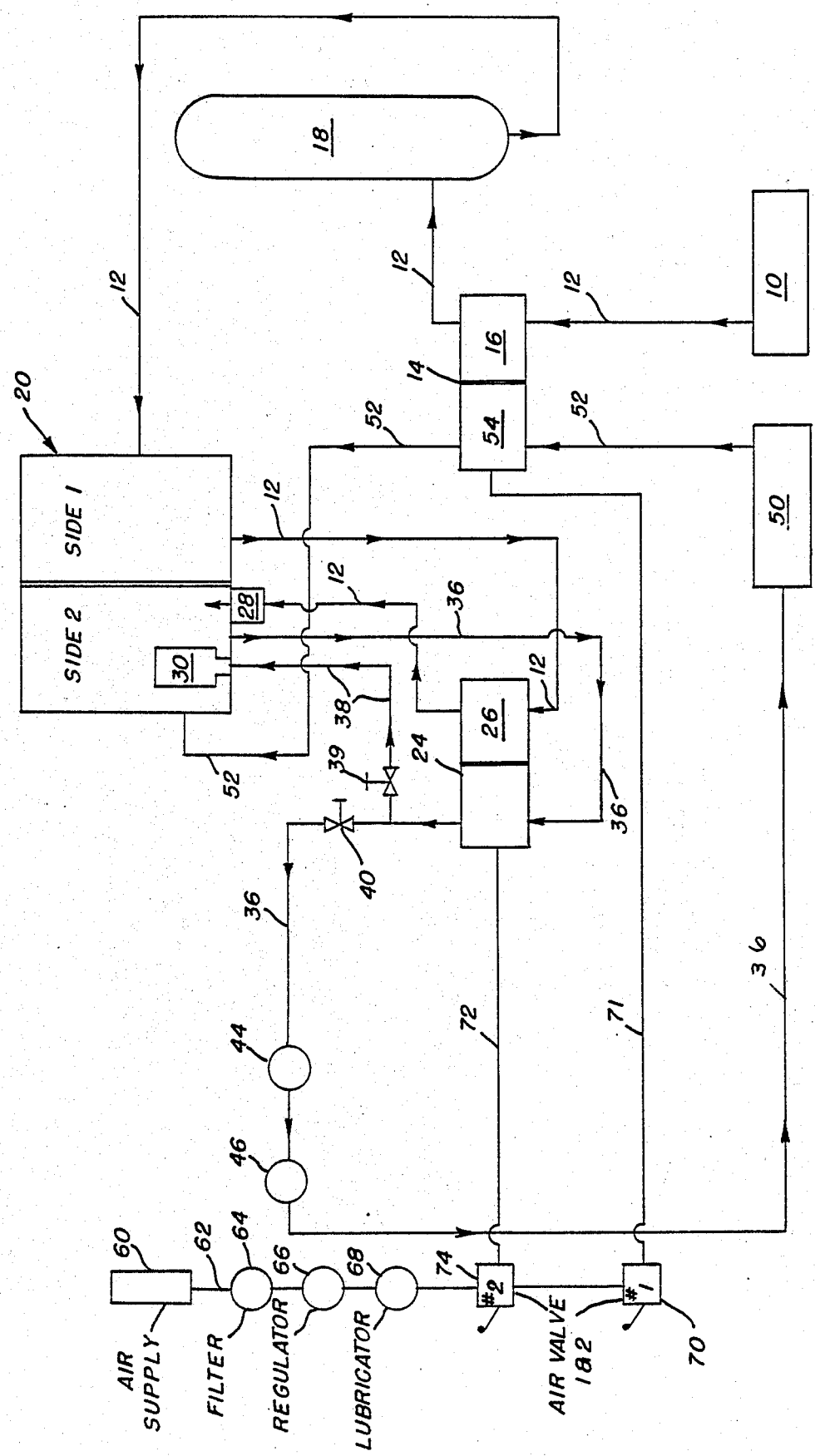
FIG. 1 is a diagrammatic view of the flow process of the present method of reclaiming contaminated oil.

In FIG. 1 contaminated oil containing unwanted trash, debris, water and other substances is pumped from oil supply container 10 (for example, the crankcase of a truck) through line 12 to a first pump 14 that is a double pump of the sort, for example, obtained from Warren Rupp-Houdaille, Inc. 800 N. Main St., Mansfield, Ohio 44905, as a sandpiper, air-powered double-diaphragm pump, Part No. SBI-A having butyl rubber balls and diaphragms with double heads. One side 16 of the pump 14 pumps the contaminated oil supply into an oil filter 18 which is obtainable on the open market and is of the type customarily used in boats, sometimes known as a "Lubrifiner", which has a filtering system that removes impurities as fine as 5 microns. The filtered oil is then pumped through line 12 into the tank 20 which is a divided tank having side 1 and side 2. A supply of oil (e.g. 100 gals.) is accumulated in side 1 of tank 20.

Figure 3:
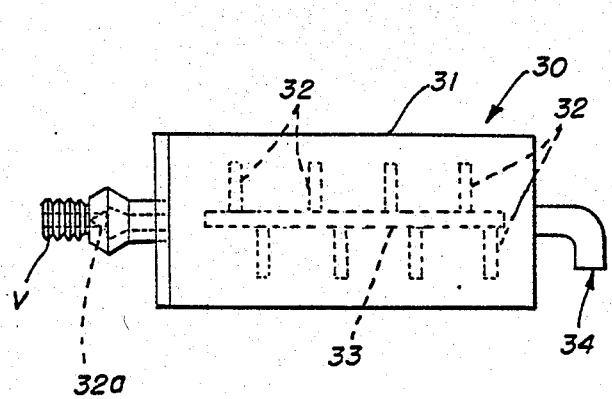
FIG. 3 is a side elevation view of the oil blender which is located inside the tank.
Figure 4:
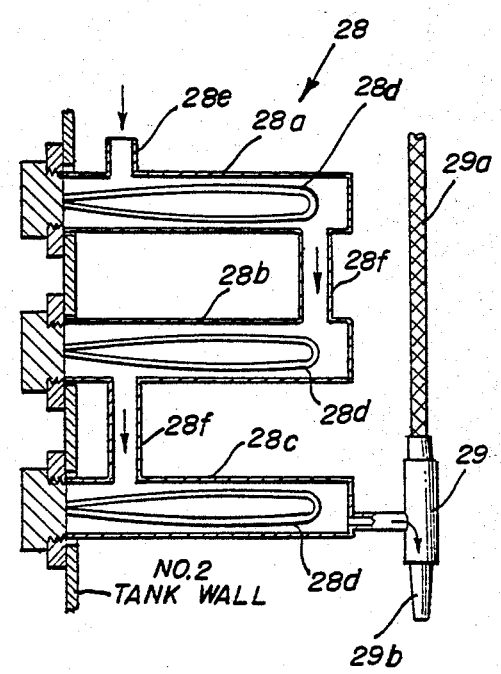
FIG. 4 is a top plan view of the heater which is inside the tank.

The oil is then pumped from the bottom of side 1 of tank 20 through line 2 into a second pump 24, which is a double pump of the same construction as first pump 14 (pump #1). Pump 24 pumps the oil through one side 26 into a heater 28 located inside side 2 of tank 20 to extract the antifreeze and water from the oil. Water must be extracted from the oil to prevent damage to diesel engines and this is done by running a small amount of the precleaned oil through the heater 28 in which the water is boiled or antifreeze is boiled out at a temperature of 180° F. The thin film dispersed across the heater 28 causes the water or antifreeze to boil at about 180° F. leaving no stream of water residue in the oil. Heater 28 (see FIG. 4) comprises a series of housings 28a, 28b and 28c in which is a respective electrical heating element 28d. Oil flows through inlet 28e in housing 28a thence through connecting conduits 28f to outlet fitting 29. The smoke or steam is taken out through the filtered vent fitting 29 and pipe 29a on top of a "Lexanne" cover to the atmosphere. The oil is then pumped from the heater 28 through discharge 29b in the fitting 29 into side no. 2 of tank 20 in which there is a blender 30 (see FIG. 3), which comprises a closed housing 31 into which the oil flows through a "C&E" (trademark) eductor V which creates a venture effect sucking oil through the eductor intake V inside the side 2 of tank 20 into housing 31 whereby the clean diesel from supply 50 is blended with the oil over a series of baffles 32 supported on a support 33. Oil is pumped from an outlet 34 through line 36 through a valve 39 back into blender 30.

From the bottom of side 2 of tank 20 through line 36 from an outlet the oil is pumped through pump 24, through a manually operated normally closed valve 40 into a water separator 44 (which for example may be a "NAPA" Separator No. 4389 having a complete assembly element No. 4390, bowl replacement No. 4338) with a flow rate of 12 GPM. From the separator 44 the oil is pumped through an oil filter 46 (which for example may be a "NAPA" fuel filter #4001-1 NPT adapter base with 15 GPM flow rate and element #4406), and then the oil is pumped into a [diesel] fuel supply depository tank 50 from which it is then again pumped through line 52, through side 54 of pump 14, and thence back into side #2 of tank 20 thence into blender 30 from which the oil is pumped out of outlet 36, through line 52 into side 38 of pump 24 thence through valve 40, water separator 44 and oil filter 46 back into the fuel supply depository tank 50. Valve 40 is closed whenever the quantity in tank 30 side 2 reaches the "full" amount (e.g. 100 gals.) by visual observation and a by-pass valve 38 is actuated manually to recirculate the oil as described previously so that oil is blended in blender 30 from inside tank 20 side 2 from line 52 as well as selectively through valve 35 and line 36.

Pumps 14 and 24 are operated from an air supply 60 (such as an air compressor) supplying compressed air thru line 62, then filter 64, regulator 66 and lubricator 68, to a first air valve 70 lending thru line 71 to pump 14 and thru a second air valve 74 to pump 24 through line 72.

Figure 2:
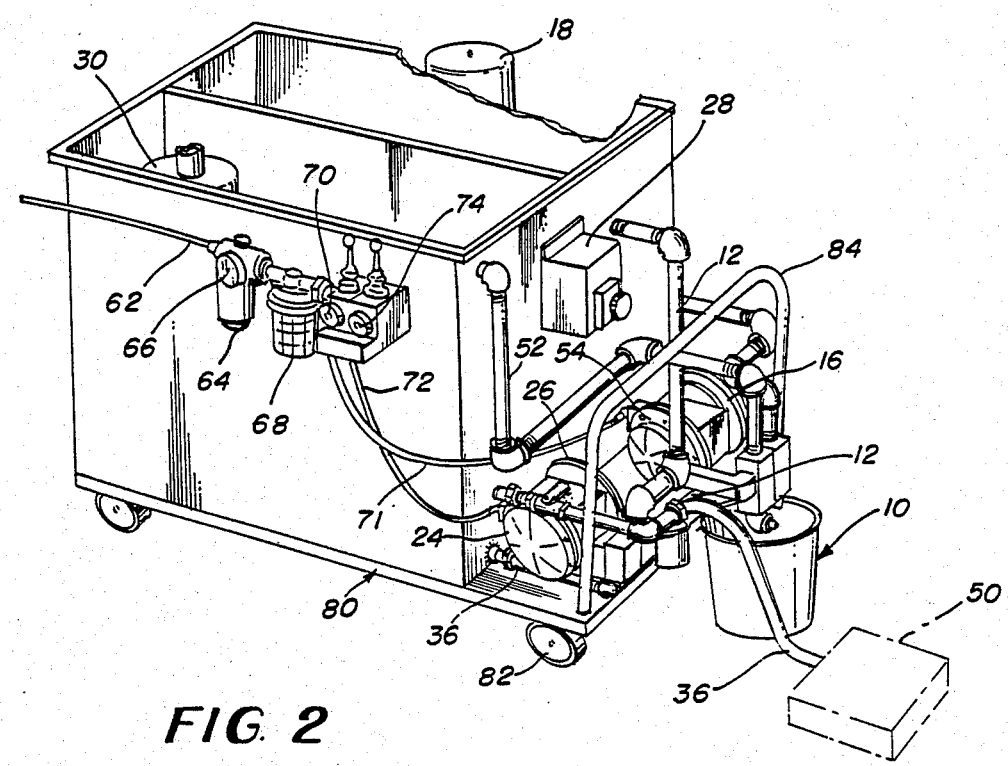
FIG. 2 is a perspective view of the portably divided tank and other apparatus used in the present process which is mounted on the tank.

Tank 20 is mounted on a cart 80 having wheels 82 and handle 84. Container 10 may be a drum or bucket or the oil can be pumped from a crankcase or tank on a truck. The operation of the apparatus on cart 80 in FIG. 2 is the same as described in connection with the other Figs. of the drawings including the diagram in FIG. 1. The description with reference numbers in FIG. 1 applies to the apparatus in FIG. 2. By way of summation, the contaminated oil from container 10 is pumped by side 16 of pump 14 through line 12, and thence through oil filter 18 from which the filtered oil is pumped into side 1 of tank 20; thence through one side 26 of second pump 24 into a heater 28 (FIG. 4) through blender 30 (FIG. 3), through a valve 40 into a water separator 44 and through an oil filter 46 through line 36 to a tank 50 from which it is pumped through line 52 and through side 54 of pump 14 back into side no. 2 of tank 20.

While I have shown and described a particular method and embodiment of the present invention this is by way of illustration and there are various alterations, changes, deviations, eliminations and departures which may be made in the method and apparatus of the preferred embodiment without avoiding the scope of this invention as defined only by a proper interpretation of the appended claims.

What is claimed is:

1. In a method of reclaiming contaminated oil wherein some solid particles have been removed by means of an oil filter and contaminants, such as antifreeze and water, have been removed such as by vaporization in a heater, the improvement comprising:
   circulating said contaminated oil and blending same in a container with an uncontaminated supply of oil which is delivered from the reclaimed uncontaminated supply.

2. The method claimed in claim 1 wherein said blended oil is directed through a means for separating water and through a filter means into said uncontaminated, reclaimed fuel supply.

3. The method claimed in claim 1 wherein said contaminated oil is blended in the container by means of a blender which receives and blends both contaminated and uncontaminated oil by directing same through a series of baffles arranged in a housing.

4. The method claimed in claim 3 wherein the contaminated oil is directed into said blender by means of a venturi which pulls uncontaminated oil into the blender from the uncontaminated container.

5. The method claimed in claim 1 wherein the contaminated oil is moved into a first container which fills to a preselected quantity and is thereafter moved into the second tank which is the container in which the oil is blended.

6. The method claimed in claim 5 wherein the flow of contaminated and uncontaminated oil is controlled by manually operated valves which are selectively operated to cause the flow of the contaminated and uncontaminated oil into the blender.

7. A method of reclaiming contaminated oil comprising:
   moving the contaminated oil through an oil filter which removes solid particles down to micron size,
   moving the oil from the oil filter to a first container and thence from said first container to a heater,
   moving said oil through said heater to remove contaminants such as antifreeze and water and other unwanted chemicals which will vaporize,
   moving said oil from said heater into a second container in which there is a blender, and
   blending said oil in said second container with an uncontaminated supply of oil which may be delivered from the reclaimed uncontaminated supply,
   delivering said blended oil to a storage container for uncontaminated oil.

8. The method in claim 7 comprising after blending sail oil:
   pumping said oil blend through a water separator to an oil filter and then into the uncontaminated fuel supply.

9. The method claimed in claim 7 wherein said flow of oil is selectively, manually interrupted by a manually controlled first valve means which prevents the blended oil from reaching the reclaimed uncontaminated supply, and directing said blended oil through a second valve means which recirculates the oil continuously into the blender from the second container.

10. The method claimed in claim 7 wherein said blender and said heater are both located inside said second container

* * * * *